(12) United States Patent
Park et al.

(10) Patent No.: US 8,837,852 B2
(45) Date of Patent: Sep. 16, 2014

(54) APPARATUS AND METHOD FOR REMOVING DEFECTIVE PIXELS

(75) Inventors: Min-Kyu Park, Seoul (KR); Han-Sae Song, Seoul (KR); Hee-Chan Park, Seoul (KR); Young-Kwon Yoon, Seoul (KR); Yong-Gu Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 831 days.

(21) Appl. No.: 13/021,098

(22) Filed: Feb. 4, 2011

(65) Prior Publication Data

US 2011/0194764 A1 Aug. 11, 2011

(30) Foreign Application Priority Data

Feb. 8, 2010 (KR) .................. 10-2010-0011522

(51) Int. Cl.
 *G06K 9/00* (2006.01)
 *H04N 5/367* (2011.01)
(52) U.S. Cl.
 CPC .................. *H04N 5/3675* (2013.01); *H04N 2209/046* (2013.01)
 USPC ............ 382/262; 382/162; 382/266; 382/275
(58) Field of Classification Search
 USPC .......................... 382/162–167, 260–266, 275
 See application file for complete search history.

(56) References Cited

U.S. PATENT DOCUMENTS

| 6,904,169 B2 * | 6/2005 | Kalevo et al. ............... 382/167 |
| 6,965,395 B1 | 11/2005 | Neter | |
| 7,835,573 B2 * | 11/2010 | Kang et al. ............... 382/167 |
| 7,876,956 B2 * | 1/2011 | Adams et al. ............... 382/167 |
| 7,983,511 B1 * | 7/2011 | Chan .......................... 382/275 |
| 2007/0002154 A1 * | 1/2007 | Kang et al. .................. 348/272 |
| 2008/0316336 A1 | 12/2008 | Oshima | |
| 2009/0154826 A1 | 6/2009 | Park et al. | |

FOREIGN PATENT DOCUMENTS

| EP | 2 101 487 | 9/2009 |
| JP | 2005-123946 | 5/2005 |
| KR | 1020000000517 | 1/2000 |
| KR | 100683415 | 2/2007 |
| KR | 1020070098263 | 10/2007 |
| KR | 100825821 | 4/2008 |
| KR | 1020090061927 | 6/2009 |
| WO | WO 99/30547 | 6/1999 |

\* cited by examiner

*Primary Examiner* — Wesley Tucker
(74) *Attorney, Agent, or Firm* — The Farrell Law Firm, P.C.

(57) ABSTRACT

A method for removing defective pixels using a signal processing scheme with a Bayer pattern, by determining an output value of the inter-channel according to whether or not a difference between a center pixel and an average of neighboring pixels, which have the same color as that of the center pixel, is greater than or equal to a threshold value; and using values of neighboring pixels nearest to a center pixel as an input, obtaining an output value of the cross-channel by finding a median value among a median value of vertical and horizontal lines including the center pixel, a median value of diagonal lines including the center pixel, and a value of the center pixel. Then, a defective pixel is removed, through the use of the output value of the inter-channel, the output value of the cross-channel, and the value of the center pixel.

22 Claims, 5 Drawing Sheets

APPARATUS AND METHOD FOR REMOVING DEFECTIVE PIXELS

PRIORITY

This application claims priority under 35 U.S.C. §119(a) to a Korean Patent Application filed in the Korean Intellectual Property Office on Feb. 8, 2010, and assigned Serial No. 10-2010-0011522, the contents of which are incorporated herein by reference.

BACKGROUND OF THE INVENTION

1. Field of the Invention

The present invention relates generally to a defective pixel removal apparatus and method, and more particularly to an apparatus and method for removing defective pixels through the use of a signal processing scheme.

2. Description of the Related Art

In general, an image sensor, such as a Complementary Metal-Oxide Semiconductor (CMOS), a Charge Coupled Device (CCD), and the like, is used to acquire an image. In such an image sensor, it is difficult for all pixels to have a uniform characteristic due to various differences in the manufacturing process. Such lack of uniformity causes pixels to have an uneven characteristic. Defective pixels generated in this way are classified into two types: "white pixels" which are pixels significantly brighter than neighboring pixels and "black pixels" which are pixels significantly darker than neighboring pixels, wherein the white and black pixels are called "defective pixels" because they are definitely distinguished from neighboring pixels. Therefore, it is considered as an important task to develop a technology to detect a defective pixel and to compensate for the defective pixel through signal processing.

Methods of removing such a defective pixel include a method of removing Laplacian noise, a method of using a weighted mean filter, a method of using a multi-directional median filter, etc.

The method of removing Laplacian noise, which is designed in consideration of the fact that a defective pixel is modeled as Laplacian noise, is effective in removing Laplacian noise such as defective pixels, and preserves edges well. However, the method of removing Laplacian noise has a problem in that, when an edge is thin, the edge is recognized as noise, and thus is removed.

The method of using a weighted mean filter requires an additional processor for determining if a center corresponds to a defective pixel, wherein it is determined if a pixel corresponds to a defective pixel through the use of a predetermined threshold value. Here, because the threshold value is determined according to a degree of noise, an accurate modeling of noise is required. That is, the capability for effective removal of defective pixels is determined depending on a degree of accuracy in determining if a pixel is a defective pixel and on a method used to remove defective pixels.

The method of using a multi-directional median filter is a method of removing defective pixels, without damaging thin edges. However, when the capability of a corresponding image sensor is deteriorated, and defective pixels consecutively appear, the consecutive defective pixels are recognized as edges, and thus are not removed.

As described above, the conventional methods for removing defective pixels have problems in that it is impossible to detect consecutive defective pixels, an edge is damaged when a normal pixel in the edge is classified as a defective pixel, and also a boundary region in an image is indistinctly expressed to lower the reliability when an edge is thin. Accordingly, it is necessary to develop a method for efficiently removing consecutive defective pixels and accurately removing only defective pixels at the same time.

SUMMARY OF THE INVENTION

Accordingly, the present invention has been designed to solve the above and other problems occurring in the prior art. It is an object of the present invention to provide an apparatus and method for accurately removing defective pixels through the use of a signal processing scheme.

In addition, the present invention provides an apparatus and method for efficiently removing consecutive defective pixels.

In accordance with an aspect of the present invention, there is provided an apparatus for removing a defective pixel, the apparatus including an inter-channel removal detection unit for determining an output value of an inter-channel, by means of a value of a center pixel and an average value of neighboring pixels which have a color equal to a color of the center pixel; a cross-channel removal detection unit for determining an output value of a cross-channel, by means of values of adjacent neighboring pixels which have a color different from the color of the center pixel and are adjacent to the center pixel; a center processing unit for outputting the value of the center pixel; a median value calculation unit for calculating a final median value from among the output value of the inter-channel, the output value of the cross-channel, and the value of the center pixel; and a defective pixel determination unit for removing a defective pixel based on a difference between the calculated final median value and the value of the center pixel.

In accordance with another aspect of the present invention, there is provided a method for removing a defective pixel in a defective pixel removal apparatus, the method including determining an output value of an inter-channel, by means of a value of a center pixel and an average value of neighboring pixels which have a color equal to a color of the center pixel; determining an output value of a cross-channel, by means of values of adjacent neighboring pixels which have a color different from the color of the center pixel and are adjacent to the center pixel; outputting the value of the center pixel; calculating a final median value among the output value of the inter-channel, the output value of the cross-channel, and the value of the center pixel; and removing a defective pixel based on a difference between the calculated final median value and the value of the center pixel.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Embodiments of the present invention are described in detail with reference to the accompanying drawings. In the description, many specific items, such as detailed component devices, are shown to provide a general understanding of the present invention. It will be understood by those skilled in the art that various changes in form and detail may be made within the scope of the present invention. Further, in the following description of the embodiments of the present invention, a detailed description of known functions and configurations incorporated herein will be omitted when it may obscure the subject matter of the present invention.

The present invention provides a method for removing defective pixels using a signal processing scheme. To this end, a method according to an embodiment of the present invention uses a Bayer pattern, and includes with respect to an inter-channel, determining an output value of the inter-channel according to whether or not a difference between a center pixel and an average of neighboring pixels, which have the same color as that of the center pixel, is greater than or equal to a threshold value; and with respect to a cross-channel, using values of neighboring pixels nearest to a center pixel as an input, and obtaining an output value of the cross-channel by finding a median value among a median value of vertical and horizontal lines including the center pixel, a median value of diagonal lines including the center pixel, and a value of the center pixel. Then, it is determined if a defective pixel is to be removed through the use of the output value of the inter-channel, the output value of the cross-channel, and the value of the center pixel. When a defective pixel is not removed, an additional defective pixel removal procedure is performed, which enables the removal of consecutive defective pixels.

Figures 1, 2:
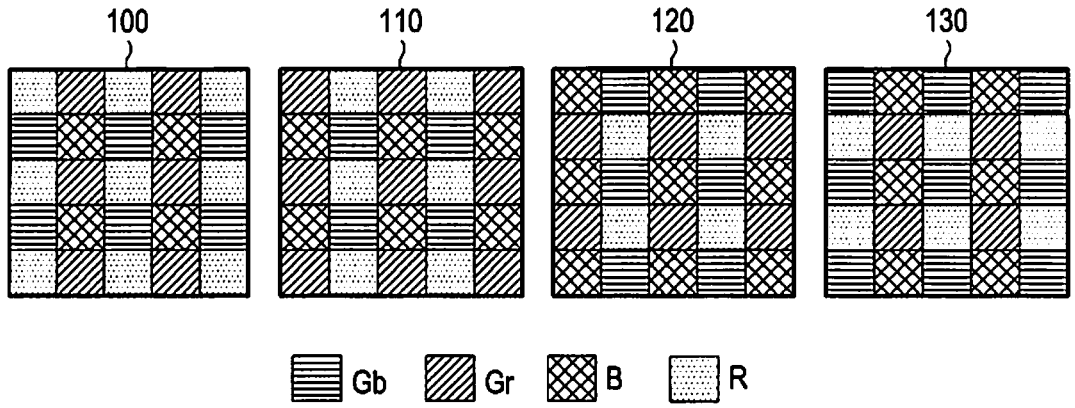
FIG. 1 is a diagram illustrating a type of a Bayer pattern which is employed in an embodiment of the present invention.
FIG. 2 is a diagram illustrating the position coordinates of each pixel in a 5×5 mask according to an embodiment of the present invention.

A Bayer pattern employed in the present invention is briefly described with reference to FIG. 1. An image sensor is equipped with color filters, wherein at least three types of color filters are used to configure a color signal. The most general color filter has a Bayer pattern in which one column including a two-color pattern of Red (R) and Green (Gr) and another column including a two-color pattern of Green (Gb) and Blue (B) are repeatedly used. Because such a Bayer pattern shows that pixels near a center have different color characteristics, the Bayer pattern may be distinguished into four types 100, 110, 120, and 130 according to four center pixels and be expressed, as illustrated in FIG. 1.

Figure 3:
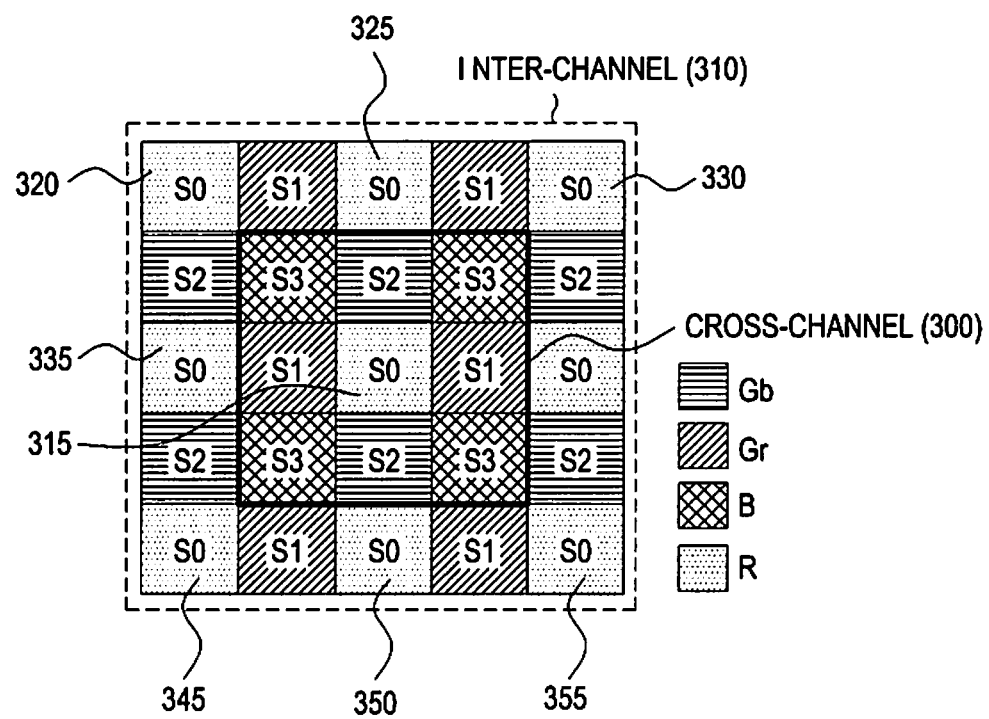
FIG. 3 is a diagram illustrating types of pixels in a Bayer pattern according to an embodiment of the present invention.

According to an embodiment of the present invention, a 5×5 Bayer pattern is used, as described above, and a procedure of removing a defective pixel, which is a detection target pixel, is performed on the assumption that there is one defective pixel in the Bayer pattern. When the position coordinates of a detection target pixel, which is assumed to be a defective pixel, are (r, c), a 5×5 mask for removing the assumed defective pixel is established as illustrated in FIG. 2. Hereinafter, for convenience, the description uses the example where a detection target pixel is a center pixel 200, as illustrated in FIG. 2, wherein, when the position coordinates of the center pixel 200 are (r, c), the value of the center pixel 200 is expressed as "in[r][c]" 200. Also, for convenience of description, types of pixels are distinguished and expressed by S0 to S3, and an example of such expression is illustrated in FIG. 3. FIG. 3 is a diagram illustrating types of pixels in a Bayer pattern according to an embodiment of the present invention. For example, in FIG. 3, when the color of a center pixel is R, the color of each pixel expressed as S0 is R, S1 represents Gr, S2 represents Gb, and S3 represents B.

Figure 4:
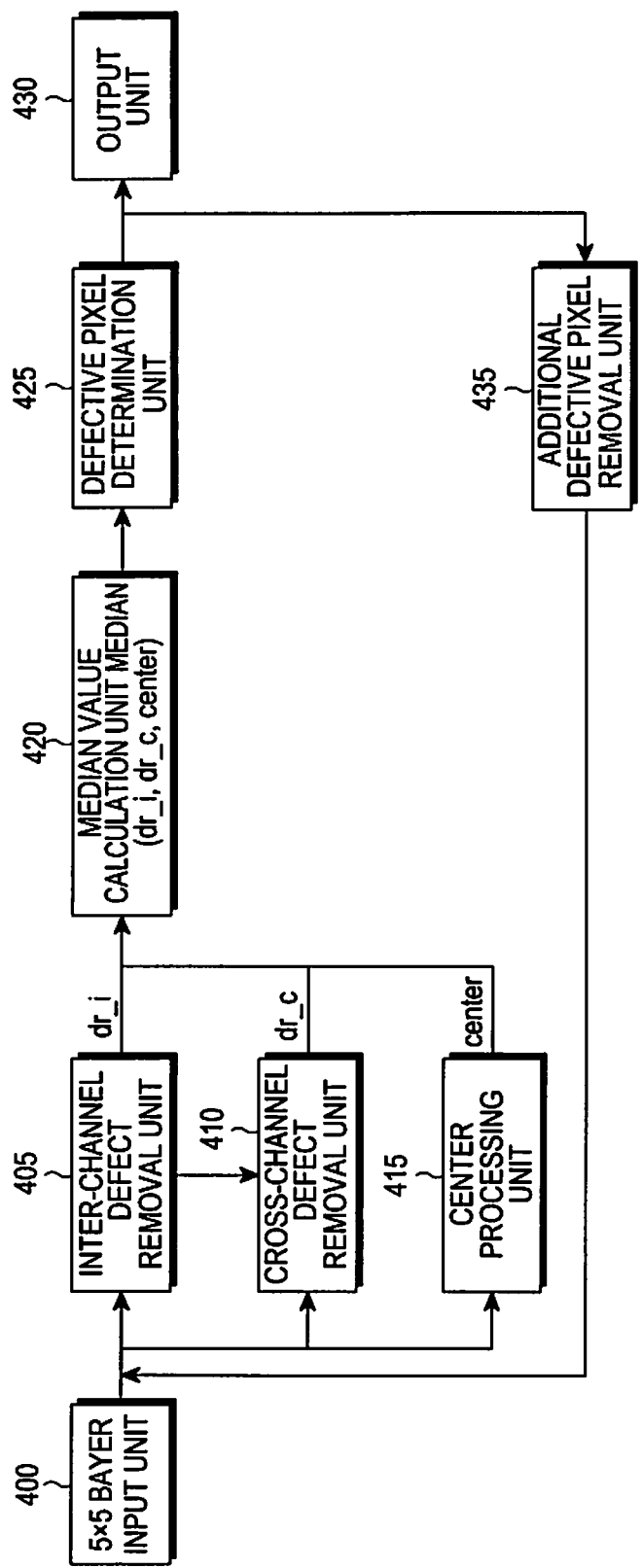
FIG. 4 is a block diagram illustrating the configuration of a defective pixel removal apparatus according to an embodiment of the present invention.

Hereinafter, the components and operation of a defective pixel removal apparatus according to an embodiment of the present invention will be described with reference to FIG. 4. The defective pixel removal apparatus removes a defective pixel from input image data, wherein the input image data may be Bayer-pattern data, as illustrated in FIG. 3, which is output from an image sensor. Here, the defective pixel removal apparatus may be installed on an image sensor, and/or may be called an "image sensor."

The present invention provides a method for classifying one Bayer pattern into an inter-channel 310 and a cross-channel 300, and removing a defective pixel by taking not only the inter-channel 310 but also the cross-channel 300 into consideration in order to efficiently remove consecutive defective pixels. To this end, when receiving a Bayer pattern through a 5×5 Bayer input unit 400, an inter-channel removal detection unit 405 calculates an output value of an inter-channel for removal detection. In addition, according to an embodiment of the present invention, a cross-channel for removal of consecutive defective pixels is also used, wherein a cross-channel removal detection unit 410 calculates an output value of a cross-channel for removal detection. A center processing unit 415 outputs a value of a center pixel in the Bayer pattern.

First, the operation of the inter-channel removal detection unit 405 is described with reference to FIG. 3. Values used in the inter-channel removal detection unit 405 are values of the inter-channel 310 having the same center, and correspond to values of eight neighboring pixels 320, 325, 330, 335, 340, 345, 350, and 355 expressed as S0 when a center pixel is S0 315, as illustrated in FIG. 3. That is, in order to remove a defect, the inter-channel removal detection unit 405 uses in[r−2][c−2], in[r−2][c], in[r−2][c+2], in[r][c−2], in[r][c], in[r][c+2], in[r+2][c−2], in[r+2][c], and in[r+2][c+2] as input values.

The inter-channel removal detection unit 405 calculates an average AVE of values of neighboring pixels, except for the value of the center pixel. Such an average is calculated by Equation (1) below.

$$AVE = \frac{(in[r-2][c-2] + [r-2][c] + in[r-2][c+2] + in[r][c-2] + in[r][c+2] + in[r+2][c-2] + in[r+2][c] + in[r+2][c+2])}{8} \quad (1)$$

Then, the inter-channel removal detection unit 405 calculates the median values of a vertical line m000 of a first direction, a first diagonal line m045 of a second direction, a horizontal line m090 of a third direction, and a second diagonal line m135 of a fourth direction, based on the center pixel.

Figure 5:
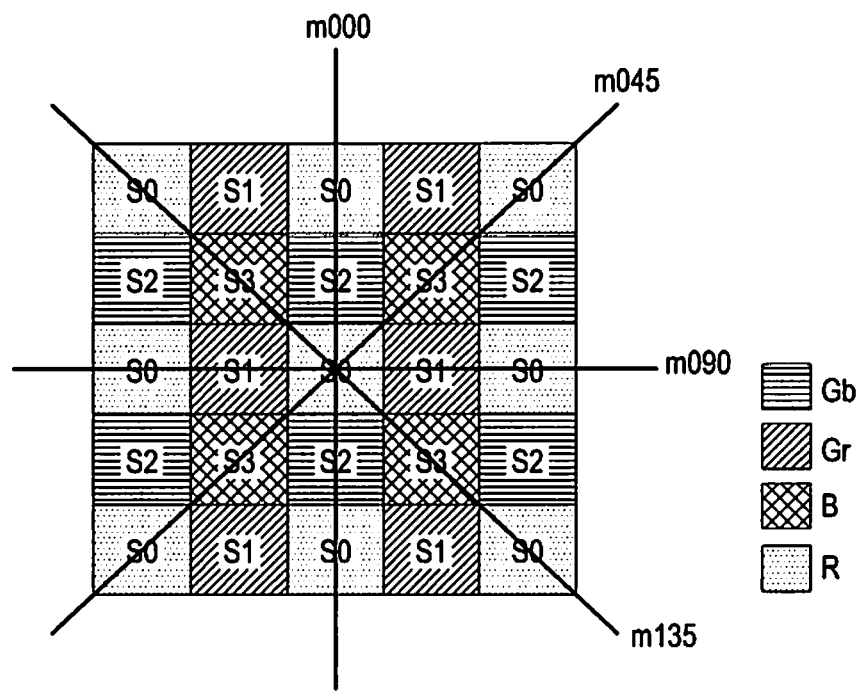
FIG. 5 is a diagram illustrating the respective lines used in an inter-channel according to an embodiment of the present invention.

Referring to FIG. 5, the first direction corresponds to a vertical direction, the second direction corresponds to a 45-degree direction, the third direction corresponds to a 90-degree direction, and the fourth direction corresponds to a 135-degree direction. The respective median values of the vertical line m000, horizontal line m090, and diagonal lines m045 and m135, which are formed in each corresponding direction and include the center pixel S0 315, are calculated. Here, FIG. 5 is a diagram illustrating the respective lines used in the inter-channel according to an embodiment of the present invention. The median values of the respective lines are calculated by Equation (2) below.

$$m_{000} = \text{median}(in[r-2][c], in[r][c], in[r+2][c])$$

$$m_{045} = \text{median}(in[r-2][c+2], in[r][c], in[r+2][c+2])$$

$$m_{090} = \text{median}(in[r][c-2], in[r][c], in[r][c+2])$$

$$m_{135} = \text{median}(in[r-2][c-2], in[r][c], in[r+2][c+2]) \quad (2)$$

Figure 6:
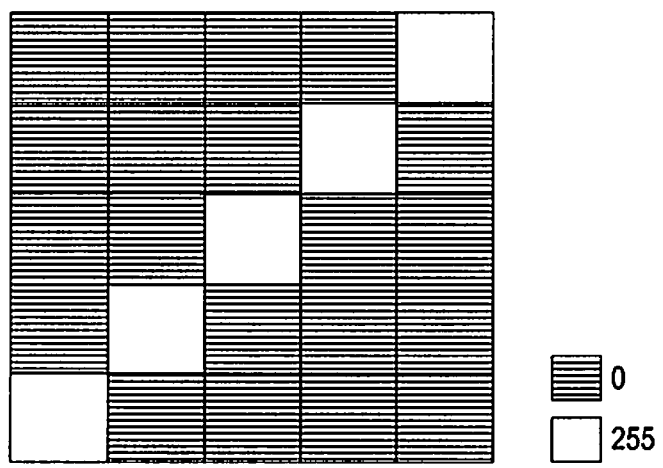
FIG. 6 is a diagram illustrating a layout of pixel values according to an embodiment of the present invention.

In Equation (2), the equation for calculating each median value can be briefly expressed as "median (a, b, c)," and according to the briefly expressed equation, a median value among values of the a, b, and c is calculated. For example, the following description uses an example where the respective pixels corresponding to the Bayer pattern illustrated in FIG. 5 have values as illustrated in FIG. 6. FIG. 6 is a diagram showing a layout of pixel values according to an embodiment of the present invention, and illustrates a case where each pixel has a value of 0 or 255.

Referring to FIG. 6, the median values of the respective lines are calculated by Equation (3) below.

$$m_{000} = \text{median}(in[r-2][c], in[r][c], in[r+2][c]) = \text{median}(0,255,0) = 0$$

$$m_{045} = \text{median}(in[r-2][c+2], in[r][c], in[r+2][c-2]) = \text{median}(255,255,255) = 255$$

$$m_{090} = \text{median}(in[r][c-2], in[r][c], in[r][c+2]) = \text{median}(0,255,0) = 0$$

$$m_{135} = \text{median}(in[r-2][c-2], in[r][c], in[r+2][c+2]) = \text{median}(0,255,0) = 0 \quad (3)$$

As shown in Equation (3), in order to obtain the median value among the vertical line m000, pixel values of S0s, i.e. in[r−2][c], in[r][c], and in[r+2][c], belonging to the vertical line m000 are used. Referring to FIG. 6, because the in[r−2][c], in[r][c], and in[r+2][c] correspond to 0, 255, and 0, respectively, a value of 0 is output as a median value among 0, 255, and 0. That is, the median value of the vertical line m000 is 0.

Similarly, in order to obtain the median value of the diagonal line m045, pixel values, i.e. in[r−2][c+2], in[r][c], and in[r+2][c−2], belonging to the diagonal line m045 are used. Referring to FIG. 6, because these pixel values correspond to 255, 255, and 255, respectively, the median value of the diagonal line m045 is 255. With respect to the horizontal line m090 and diagonal line m135, the similar scheme is used to obtain the median value of each corresponding line.

When the respective median values of the vertical line m000, horizontal line m090, and diagonal lines m045 and m135 are calculated by Equation (3), as described above, the value "out1" of an edge directional median filter can be obtained by Equation (4) below.

$$\text{out1} = \text{median}(\text{median}(m_{000}, m_{090}, in[r][c]), \text{median}(m_{045}, m_{135}, in[r][c]), in[r][c]) \quad (4)$$

In Equation (4), first, a median value among a median value of the vertical line m000, a median value of the horizontal line m090, and a value of the center pixel becomes median (0, 0, 255) based on FIG. 6. Also, a median value among the respective median values of the diagonal lines m045 and m135 and a value of the center pixel is expressed as median (m045, m135, in[r][c]), and becomes median (255, 0, 255) based on FIG. 6. Accordingly, the value "out1" of an edge directional median filter is expressed as "median (median (0, 0, 255), median (255, 0, 255), 255)." That is, median (0, 255, 255) results in 255 as a median value among 0, 255, and 255, so that a final output value "out1" becomes 255. When such a method is used, it is possible to completely remove a defective pixel, without damaging a thin edge.

The value "out1" of an edge directional median filter, calculated by substituting the pixel values based on FIG. 6, as described above, is obtained as shown in Equation (5) below.

$$\text{out} = \text{median}(\text{median}(m_{000}, m_{090}, in[r][c], \text{median}(m_{045}, m_{135}, in[r][c]), in[r][c]) \quad (5)$$

$$= \text{median}(\text{median}(0, 0, 255), \text{median}(255, 0, 255), 255)$$

$$= \text{median}(0, 255, 255)$$

$$= 255$$

The inter-channel removal detection unit 405 calculates an output value "dr_i" of the inter-channel 310 from the average AVE obtained by Equation (1) and the value "out1" of an edge directional median filter obtained by Equation (4). The output value "dr_i" of the inter-channel 310 is obtained by Equation (6) below.

count_$i$=0 if ($abs$(AVE−in[r−2][c−2])<$th$(AVE)){count_$i$++;} if ($abs$(AVE−in[r−2][c])<$th$(AVE)){count_$i$++;} if ($abs$(AVE−in[r−2][c+2])<$th$(AVE)){count_$i$++;} if ($abs$(AVE−in[r][c−2])<$th$(AVE)){count_$i$++;} if ($abs$(AVE−in[r][c+2])<$th$(AVE)){count_$i$++;} if ($abs$(AVE−in[r+2][c−2])<$th$(AVE)){count_$i$++;} if ($abs$(AVE−in[r+2][c])<$th$(AVE)){count_$i$++;} if ($abs$(AVE−in[r+2][c+2])<$th$(AVE)){count_$i$++;} if (count_$i$=8&&$abs$(AVE−in[r][c])>$th$(AVE)×$c\_i$)
  {$dr\_i$=out1;} else{$dr\_i$=in[r][c];}

In Equation (6), "th(AVE)" is a function which varies depending on an average, and varies depending on the characteristics of image sensors. Generally, the "th(AVE)" is a function of a monotone increase based on mean brightness. "count_i" is a criterion for determining how closely the values of neighboring pixels cluster around an average. "c_i" represents an arbitrary constant. For example, when the "count_i" has a value of 8, it means that the values of neighboring pixels closely cluster around an average. That is, whenever a difference between an average AVE and a neighboring pixel value is less than "th(AVE)," representing a threshold value, the "count_i" increases by one, which means that the neighboring pixel value is similar to the average. Therefore, when the "count_i" has a value of 8, it means that all of eight neighboring pixels have values similar to the average.

Satisfying "abs(AVE−in[r][c]>th(AVE)×c_i" means that the value of a center pixel is different from an average, it means that there is a high possibility that a corresponding pixel is a defective pixel. Therefore, satisfying a conditional expression if(count_i=8 && abs(AVE−in[r][c])>th(AVE)× c_i), which is expressed in the last line of Equation (6), means that the values of eight neighboring pixels are all similar to an average, and only a center pixel has a different value from the average, which represents that a possibility that the center pixel is a defective pixel is high. Therefore, when such a condition is satisfied, the value of the center pixel S0 is corrected by Equations (2) and (4). Accordingly, the output value "dr_i" of the inter-channel 310 becomes the value "out1" of the edge directional median filter. In contrast, when the aforementioned condition is not satisfied, the value of the center pixel S0, i.e. in[r][c], is used as the output value "dr_i" of the inter-channel 310, without change. Then, the inter-channel removal detection unit 405 transfers the output value dr_i to a median value calculation unit 420.

According to an embodiment of the present invention, a cross-channel is used to enable the removal of consecutive defective pixels. An output value of the cross-channel is calculated by the cross-channel defect removal unit 410. Differently from the inter-channel removal detection unit 405, in which only the same color (or channel) is used, the cross-channel removal detection unit 410 uses values of eight neighboring pixels nearest to a center pixel as input values. For example, as illustrated in FIG. 3, when a pixel S0 315 is established as a center pixel, neighboring pixels surrounding the center pixel S0 in the cross-channel 300 are used. That is, the cross-channel removal detection unit 410 uses in[r−1][c−1], in[r−1][c], in [r−1][c+1], in[r][c−1], in[r][c+1], in[r+1][c−1], in[r+1][c], and in[r+1][c+1] as input values thereof.

The output value "dr_c" of the cross-channel removal detection unit 410 is calculated by Equation (7) below.

$$dr\_c=\text{median}(\text{median}(mc_{000},mc_{090},in[r][c]),\text{median}(mc_{045},mc_{135},in[r][c]),in[r][c]) \quad (7)$$

In Equation (7), $mc_{000}$, $mc_{045}$, $mc_{090}$, and $mc_{135}$ may be obtained by Equation (8) below.

$$mc_{000}=\text{median}(in[r−1][c],in[r][c],in[r+1][c])$$

$$mc_{045}=\text{median}(in[r−1][c+1],in[r][c],in[r+1][c−1])$$

$$m_{090}=\text{median}(in[r][c−1],in[r][c],in[r][c+1])$$

$$mc_{135}=\text{median}(in[r−1][c−1],in[r][c],in[r+1][c+1]) \quad (8)$$

In Equation (8), $mc_{000}$ represents a median value of a vertical line in the cross-channel 300, wherein the $mc_{000}$ is obtained by finding a median value of pixels' values, i.e. in[r−1][c], in [r][c], and in[r+1][c], belonging to the vertical line. In a similar scheme, a median value $mc_{090}$ of a horizontal line, and median values $mc_{045}$ and $mc_{135}$ of diagonal lines in the cross-channel 300 can be obtained. By substituting the obtained $mc_{000}$, $mc_{045}$, $mc_{090}$, and $m_{135}$, into Equation (7), the output value "dr_c" of the cross-channel 300 can be acquired. The output value "dr_c" of the cross-channel removal detection unit 410 is transferred to the median value calculation unit 420.

Then, the median value calculation unit 420 calculates a final median value "out2," through the use of the output value "dr_i" of the inter-channel removal detection unit 405, the output value "dr_c" of the cross-channel removal detection unit 410, and an output value "center", i.e. a center pixel's value in[r][c], which is output from the center processing unit 415. The final median value "out2" is obtained by Equation (9) below.

$$out2=\text{median}(dr\_i,dr\_c,in[r][c]) \quad (9)$$

The final median value "out2" obtained by Equation (9) is transferred to a defective pixel determination unit 425. Then, the defective pixel determination unit 425 determines if the final median value "out2" corresponds to a value from which a defective pixel has been removed. In detail, when a difference between the final median value "out2" and a center pixel's value, i.e. in[r][c], is greater than or equal to a threshold value, the defective pixel determination unit 425 determines that a defective pixel has been removed, and outputs the result to the output unit 430. When it is determined that a center pixel is not a defective pixel in connection with Equation (6), the output value "dr_i" becomes equal to in[r][c]. Accordingly, the final median value "out2" is "median(in[r][c], dr_c, in[r][c])," so that the final median value "out2" becomes in[r][c]. In contrast, when a difference between the final median value "out2" and a center pixel's value, i.e. in[r][c], is less than a threshold value, it is determined that there is another defective pixel to be removed. Then, an additional defective pixel removal unit 435 performs an additional defective pixel removal operation, which may be expressed as Equation (10) below.

```
if (abs(out2−in[r][c])>abs(AVE−out2)×3){
    defective pixel removal
    result output
}
else{
    performance of additional defective pixel removal operation
}
```
... (10)

In Equation (10), (abs(out2−in[r][c])>abs (AVE−out2)×3) is a conditional expression for determining if the final median value "out2" is nearer to an average than the value of a center pixel. When the conditional expression is satisfied, the final median value "out2" is output as a result, without an additional defective pixel processing procedure. In contrast, when the conditional expression is not satisfied, the procedure proceeds to performing an additional defective pixel removal operation. For example, when final median value "out2" is in[r][c], "abs(out2−in[r][c])" becomes zero, so that the conditional expression is not satisfied. Accordingly, if a procedure of removing one defective pixel has been performed, it becomes necessary to perform a procedure of removing two defective pixels. As described above, according to an embodiment of the present invention, a separate threshold value for determining a defective pixel is not required, and compensation for a defective pixel can be automatically achieved because the respective pixel values are used.

Figure 7:
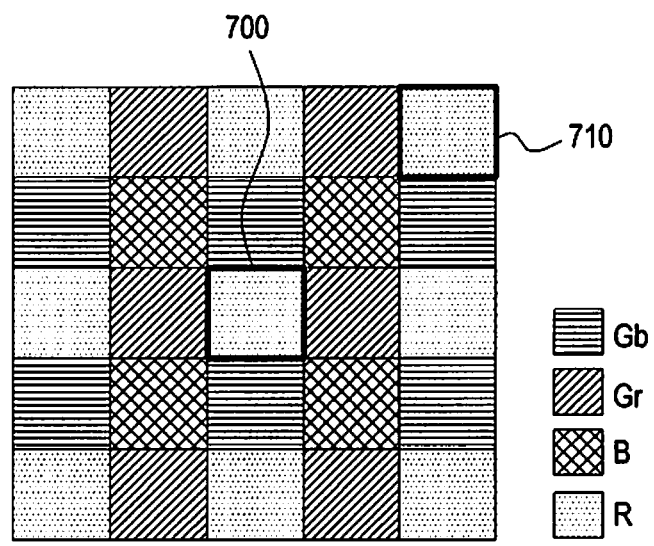
FIG. 7 is a diagram illustrating the positions of two defective pixels according to an embodiment of the present invention.

The additional defective pixel removal operation is similar to the operation for removing one defective pixel, except for the operation of the inter-channel removal detection unit 405. First, the additional defective pixel removal unit 435 functions to notify the inter-channel removal detection unit 405 that an additional defective pixel removal must be performed. The operation of the inter-channel removal detection unit 405 for an additional defective pixel removal will be described with reference to FIG. 7. FIG. 7 is a diagram showing the positions of two defective pixels according to an embodiment of the present invention. As illustrated in FIG. 7, for explanation of the additional defective pixel removal, it is assumed that not only a center pixel 700 but also one pixel 710 of neighboring pixels is a defective pixel.

Accordingly, the output value "dr_i" calculated by the inter-channel removal detection unit 405 varies. First, in order to obtain the output value "dr_i" for an inter-channel, it is necessary to calculate an average "AVE." To this end, Equation (1) used previously to obtain an average AVE when removing one defective pixel is modified to Equation (11) below.

(4). Such an output value "dr_i" of an inter-channel for an additional defective pixel removal may be obtained by Equation (12) below.

count_$i$=0 if ($abs$(AVE2-in[$r$-2][$c$-2])<$th$(AVE)×$c$2){count_ $i$++;} if ($abs$(AVE2-in[$r$-2][$c$])<$th$(AVE)×$c$2){count_$i$++;} if ($abs$(AVE2-in[$r$-2][$c$+2])<$th$(AVE)×$c$2){count_ $i$++;} if ($abs$(AVE2-in[$r$][$c$-2])<$th$(AVE)×$c$2){count_$i$++;} if ($abs$(AVE2-in[$r$][$c$+2])<$th$(AVE)×$c$2){count_$i$++;}

$$AVE = \frac{\begin{pmatrix} in[r-2][c-2] + in[r-2][c] + in[r-2][c+2] + in[r][c-2] + \\ in[r][c+2] + in[r+2][c-2] + in[r+2][c] + in[r+2][c+2] \end{pmatrix}}{8} \quad (11)$$

```
MAX=0
pr=0
pc=0
for (rr=-2, rr<3, rr+=2){
    for (cc=-2, cc<3, cc+=2){
        if ((rr!=0&&cc!=0)&&abs(AVE-in[r+rr][c+cc])>MAX&&abs(in[r+rr][c+cc]-in[r][c]) <abs(AVE-in[r][c]){
            MAX=in[r+rr][c+cc]
            pr=rr
            pc=cc
        }
    }
}
AVE'=max(0,(AVE*8-in[r+pr][c+pc])>>3)
in[r+pr][c+pc]=AVE'
AVE=AVE'
```

In Equation (11), max(x, y) represents a greater value of two values, i.e. x and y. "pr" and "pc" represent the ordinate and abscissa of a pixel, respectively, which is one of neighboring pixels, has a value largely different from an average while being located near a center pixel. In Equation (11), a first condition "rr!=0& &cc!=0" is a condition for determining if a pixel corresponds to a neighboring pixel. A second condition "abs(AVE-in[r+rr][c+cc])>MAX" is a condition for determining if a difference between an average AVE and the value of a neighboring pixel is greater than a MAX. That is, the second condition is intended to obtain a pixel having a value which has the largest difference from an average "AVE." A third condition "abs(in[r+rr][c+cc]-in[r][c])<abs (AVE-in[r][c])" is a condition for determining if a difference between a pixel value of the current position coordinates and a value of a center pixel is less than a difference between an average AVE and the value of the center pixel. Therefore, when the three conditions are satisfied, a pixel, i.e. in[r+pr] [c+cp], which is one of neighboring pixels, and is most identical to the center pixel assumed to be a defective pixel, is determined to be an additional defective pixel. Accordingly, the value of the pixel determined to be an additional defective pixel is substituted by a new average AVE', and the previous average AVE is substituted by a new average AVE', too.

Then, the inter-channel removal detection unit 405 calculates a new output value "dr_i" through the use of an average AVE obtained by Equation (11), and the value "out1" of the edge directional median filter obtained by Equations (2) and if ($abs$(AVE2-in[$r$+2][$c$-2])<$th$(AVE)×$c$2){count_ $i$++;} if ($abs$(AVE2-in[$r$+2][$c$])<$th$(AVE)×$c$2){count_$i$++;} if ($abs$(AVE2-in[$r$+2][$c$+2])<$th$(AVE)×$c$2){count_ $i$++;} if (count_$i$=8&&$abs$(AVE-in[$r$][$c$])>$th$(AVE)×$c$2× $c$_$i$){dr_$i$=out of Equation 6;}else{dr_$i$=in[$r$] [$c$];}     (12)

Equation (12) is shown to be similar to Equation (6), but there is a difference in that a value of c2 is used in Equation (12). Here, the value of c2 is greater than 1. As the value of c2 is increases, the possibility that a center pixel is determined to be a defective pixel decreases.

When a new output value "dr_i" is calculated by Equation (12), the median value calculation unit 420 calculates a final median value "out2" through the use of the new output value "dr_i," a previous output value "dr_c" of a cross-channel, and the value "in[r][c]" of the center pixel. The final median value "out2" calculated as above is transferred to the defective pixel determination unit 425. Then, the defective pixel determination unit 425 determines if the final median value "out2" represents a value from which a defective pixel has been removed. When the conditions of Equation (10) are satisfied, it means that two defective pixels have been removed, so that a final result is output through the output unit 430. In contrast, when the conditions of Equation (10) are not satisfied, it is determined if it is necessary to additionally remove a defective pixel. That is, it is determined if three defective pixels should be removed. Generally, even the assumption that a maximum of two consecutive defective pixels may exist is enough to remove defective pixels. If there are three or more defective pixels, it is possible to perform a procedure of removing N number of defective pixels by repeating the procedure aforementioned according to an embodiment of the present invention.

According to an embodiment of the present invention, because not only an inter-channel but also a cross-channel is used, it is possible to remove a plurality of consecutive defective pixels, without reducing the resolution. Also, the apparatus and method of the present invention are excellent in processing of edges and white spots. Also, because the directions of edges are taken into consideration, the interruption of edges can be prevented. In addition, because a separate threshold value for determining a defective pixel is not required, and compensation for a defective pixel can be automatically achieved.

It is apparent that the method for removing a defective pixel according to the present invention can be achieved using hardware, software (i.e. a program), or a combination thereof. Such a program may be stored in a volatile or non-volatile recording medium which can be read by a machine such as a computer. The computer-readable recording medium stores the program and a processor executes the method. The recording medium may be a storage device, such as a Read-Only Memory (ROM), a memory, such as a Random Access Memory (RAM), a memory chip and an integrated chip, or an optical or magnetic recording medium, such as a Compact Disk (CD), a Digital Versatile Disk (DVD), a magnetic disk and a magnetic tape. Namely, the edge-adaptive interpolation and noise filtering method of the present invention may be implemented in the form of a program including codes for achieving the method. Furthermore, the program may be electrically transmitted through an arbitrary medium such as communication signals propagated by wire or wirelessly and the present invention includes equivalents thereto.

While the invention has been shown and described with reference to certain embodiments thereof, it will be understood by those skilled in the art that various changes in form and detail may be made therein without departing from the spirit and scope of the invention as defined by the appended claims. Accordingly, the scope of the invention is not to be limited by the above embodiments but by the claims and the equivalents thereof.

What is claimed is:

1. An apparatus for correcting a defective pixel, the apparatus comprising:
   an inter-channel removal detection unit for determining an output value of an inter-channel, using a pixel value of a center pixel and an average pixel value of neighboring pixels which have a color which is the same as a color of the center pixel;
   a cross-channel removal detection unit for determining an output value of a cross-channel, using pixel values of adjacent pixels which have a color different from the color of the center pixel and are adjacent to the center pixel;
   a center processing unit for outputting the value of the center pixel;
   a median value calculation unit for calculating a final median value of the output value of the inter-channel, the output value of the cross-channel, and the value of the center pixel; and
   a defective pixel determination unit for determining whether there is a defective pixel based on a difference between the calculated final median value and the value of the center pixel.

2. The apparatus as claimed in claim 1, wherein, when a difference between the value of the center pixel and the average value is greater than or equal to a threshold value, the inter-channel removal detection unit calculates respective median values of first, second, third, and fourth directional lines with the center pixel as a center, using the value of the center pixel and the value of the neighboring pixels which have the color equal to the color of the center pixel; calculates a median value of the inter-channel using the calculated median values; and determines the calculated median value of the inter-channel to be the output value of the inter-channel.

3. The apparatus as claimed in claim 2, wherein, when the respective median values are calculated, the inter-channel removal detection unit determines a final median value to be the output value of the inter-channel, the final median value being a median value among a median value among the median value of the first directional line, the median value of the third directional line, and the value of the center pixel; a median value among the median value of the second directional line, the median value of the fourth directional line, and the value of the center pixel; and the value of the center pixel.

4. The apparatus as claimed in claim 2, wherein, when the difference between the value of the center pixel and the average value is less than the threshold value,
   the inter-channel removal detection unit determines the value of the center pixel to be the output value of the inter-channel.

5. The apparatus as claimed in claim 1, wherein the cross-channel removal detection unit calculates respective median values of first, second, third, and fourth directional lines with the center pixel as a center, using the value of the center pixel and the value of the adjacent neighboring pixels, and determines the output value of the cross-channel using the calculated median values.

6. The apparatus as claimed in claim 5, wherein, when the respective median values are calculated,
   the cross-channel removal detection unit determines a final median value to be the output value of the cross-channel, the final median value being a median value among a median value among the median value of the first directional line, the median value of the third directional line, and the value of the center pixel; a median value among the median value of the second directional line, the median value of the fourth directional line, and the value of the center pixel; and the value of the center pixel.

7. The apparatus as claimed in claim 2, wherein the first directional line corresponds to a vertical directional line, the second directional line corresponds to a 45-degree directional line with respect to the first directional line, the third directional line corresponds to a 90-degree directional line with respect to the first directional line, and the fourth directional line corresponds to a 135-degree directional line with respect to the first directional line.

8. The apparatus as claimed in claim 1, wherein, when the difference between the calculated final median value and the value of the center pixel is greater than a difference between the calculated final median value and the average value, the defective pixel determination unit determines that the center pixel is a defective pixel, and removes the defective pixel.

9. The apparatus as claimed in claim 8, wherein, when the difference between the calculated final median value and the value of the center pixel is less than the difference between the calculated final median value and the average value, the defective pixel determination unit determines that there is a defective pixel to be additionally removed.

10. The apparatus as claimed in claim 9, wherein, when there is a defective pixel to be additionally removed,
the inter-channel removal detection unit determines a pixel, which has a largest difference from the average value while being closest to the value of the center pixel among the neighboring pixels having the color equal to the color of the center pixel, to be an additional defective pixel, and substitutes the average value by a value of the additional defective pixel, thereby determining a new average value.

11. The apparatus as claimed in claim 10, wherein the inter-channel removal detection unit determines a new output value of the inter-channel using the value of the center pixel, the neighboring pixels having the color equal to the color of the center pixel, and the new average value.

12. The apparatus as claimed in claim 11, wherein the median value calculation unit calculates a new median value from among the new output value of the inter-channel, the output value of the cross-channel, and the value of the center pixel, and
the defective pixel determination unit removes the additional defective pixel based on a difference between the calculated new median value and the value of the center pixel.

13. A method for correcting a defective pixel in a defective pixel removal apparatus, the method comprising:
determining an output value of an inter-channel, using a pixel value of a center pixel and an average pixel value of neighboring pixels which have a color which is the same as a color of the center pixel;
determining an output value of a cross-channel, using pixel values of adjacent pixels which have a color different from the color of the center pixel and are adjacent to the center pixel;
outputting the value of the center pixel;
calculating a final median value of the output value of the inter-channel, the output value of the cross-channel, and the value of the center pixel; and
determining whether there is a defective pixel based on a difference between the calculated final median value and the value of the center pixel.

14. The method as claimed in claim 13, wherein determining the output value of the inter-channel comprises:
determining if a difference between the value of the center pixel and the average value is greater than or equal to a threshold value;
calculating respective median values of first, second, third, and fourth directional lines with the center pixel as a center, using the value of the center pixel and the value of the neighboring pixels which have the color equal to the color of the center pixel when the difference between the value of the center pixel and the average value is greater than or equal to the threshold value;
calculating a median value of the inter-channel using the calculated median values; and
determining the calculated median value of the inter-channel to be the output value of the inter-channel.

15. The method as claimed in claim 14, wherein the output value of the inter-channel corresponds to a final median value among a median value among the median value of the first directional line, the median value of the third directional line, and the value of the center pixel; a median value among the median value of the second directional line, the median value of the fourth directional line, and the value of the center pixel; and the value of the center pixel.

16. The method as claimed in claim 14, further comprising outputting the value of the center pixel as the output value of the inter-channel when the difference between the value of the center pixel and the average value is less than the threshold value.

17. The method as claimed in claim 13, wherein determining the output value of the cross-channel comprises:
calculating respective median values of first, second, third, and fourth directional lines with the center pixel as a center, using the value of the center pixel and the value of the adjacent neighboring pixels; and
determining the output value of the cross-channel using the calculated median values.

18. The method as claimed in claim 17, wherein the output value of the inter-channel corresponds to a final median value among a median value among the median value of the first directional line, the median value of the third directional line, and the value of the center pixel; a median value among the median value of the second directional line, the median value of the fourth directional line, and the value of the center pixel; and the value of the center pixel.

19. The method as claimed in claim 14, wherein the first directional line corresponds to a vertical directional line, the second directional line corresponds to a 45-degree directional line with respect to the first directional line, the third directional line corresponds to a 90-degree directional line with respect to the first directional line, and the fourth directional line corresponds to a 135-degree directional line with respect to the first directional line.

20. The method as claimed in claim 13, wherein determining whether there is the defective pixel comprises:
determining if the difference between the calculated final median value and the value of the center pixel is greater than a difference between the calculated final median value and the average value;
determining that the center pixel is a defective pixel; and
removing the defective pixel when the difference between the calculated final median value and the value of the center pixel is greater than the difference between the calculated final median value and the average value.

21. The method as claimed in claim 20, further comprising:
determining that there is a defective pixel to be additionally removed when the difference between the calculated final median value and the value of the center pixel is less than the difference between the calculated final median value and the average value;
determining a pixel, which has a largest difference from the average value while being closest to the value of the center pixel among the neighboring pixels having the color equal to the color of the center pixel, to be an additional defective pixel;
determining a new average value;
substituting the average value by the new average value; and
substituting the value of the additional defective pixel by the new average value.

22. The method as claimed in claim 21, further comprising:
determining a new output value of the inter-channel, using the value of the center pixel, the neighboring pixels having the color equal to the color of the center pixel, and the new average value;
calculating a new median value from among the new output value of the inter-channel, the output value of the cross-channel, and the value of the center pixel; and removing the additional defective pixel based on a difference between the calculated new median value and the value of the center pixel.

* * * * *